(12) United States Patent
Tsu et al.

(10) Patent No.: US 11,630,944 B2
(45) Date of Patent: *Apr. 18, 2023

(54) METHOD AND SYSTEM FOR LABELING AND ORGANIZING DATA FOR SUMMARIZING AND REFERENCING CONTENT VIA A COMMUNICATION NETWORK

(71) Applicant: PowerNotes LLC, Chicago, IL (US)

(72) Inventors: Wilson Tsu, Chicago, IL (US); Srujani Pagidipati, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/177,132

(22) Filed: Oct. 31, 2018

(65) Prior Publication Data
US 2019/0163732 A1 May 30, 2019

Related U.S. Application Data

(63) Continuation of application No. 14/215,843, filed on Mar. 17, 2014.

(60) Provisional application No. 61/793,717, filed on Mar. 15, 2013.

(51) Int. Cl.
G06F 40/169 (2020.01)
G06F 16/38 (2019.01)

(52) U.S. Cl.
CPC .......... *G06F 40/169* (2020.01); *G06F 16/382* (2019.01)

(58) Field of Classification Search
CPC ...... G06F 17/24; G06F 3/0484; G06F 16/382; G06F 40/169
See application file for complete search history.

(56) References Cited

U.S. PATENT DOCUMENTS

| | | | |
|---|---|---|---|
| 5,179,649 A | 1/1993 | Masuzaki et al. | |
| 5,924,105 A | 7/1999 | Punch, III et al. | |
| 6,964,013 B1* | 11/2005 | Ono | G06F 40/134 715/207 |
| 8,081,750 B1* | 12/2011 | Ehlinger | H04M 1/2757 379/355.02 |
| 8,655,404 B1* | 2/2014 | Singh | G06Q 50/01 455/556.1 |
| 9,268,858 B1* | 2/2016 | Yacoub | G06F 16/24573 |
| 2002/0145626 A1* | 10/2002 | Richards | G06Q 30/02 715/741 |

(Continued)

OTHER PUBLICATIONS

PC World, internet publication, Oct. 7, 2008.*

(Continued)

*Primary Examiner* — Justin S Lee
(74) *Attorney, Agent, or Firm* — Husch Blackwell LLP (57) ABSTRACT

Systems and methods of the present technology generally provide computer implemented assistance for data summary, including organizing and generating a summary of data selected form source documents. In accordance with the present technology, a user identifies a subset of information from one or more source documents, assigns an identifier to the user-identified information, and may add custom information. The user can repeat the identification and assignment steps using multiple source documents, as many times as desired. The system then analyzes and prioritizes the user-identified information and any custom information, and generates a formatted summary.

6 Claims, 9 Drawing Sheets

(56) References Cited

U.S. PATENT DOCUMENTS

| | | | | |
|---|---|---|---|---|
| 2002/0167548 | A1* | 11/2002 | Murray | G06F 3/0482 715/825 |
| 2003/0206189 | A1* | 11/2003 | DeMello | G06F 3/0482 715/711 |
| 2004/0015539 | A1* | 1/2004 | Alegria | G06F 40/166 709/203 |
| 2005/0039141 | A1* | 2/2005 | Burke | G06F 3/0482 715/845 |
| 2005/0278293 | A1* | 12/2005 | Imaichi | G06F 16/93 |
| 2006/0026495 | A1 | 2/2006 | Shaw et al. | |
| 2006/0047770 | A1* | 3/2006 | Marappan | G06Q 10/107 709/207 |
| 2007/0022386 | A1* | 1/2007 | Boss | G06F 9/543 715/764 |
| 2007/0233692 | A1* | 10/2007 | Lisa | G06F 3/0488 |
| 2007/0266342 | A1* | 11/2007 | Chang | G06F 16/9535 715/810 |
| 2008/0214215 | A1 | 9/2008 | Aaltonen et al. | |
| 2009/0113306 | A1* | 4/2009 | Fujishita | G09B 21/001 715/729 |
| 2009/0287671 | A1 | 11/2009 | Bennett | |
| 2010/0251295 | A1* | 9/2010 | Amento | H04N 21/6587 725/38 |
| 2011/0117063 | A1 | 5/2011 | Klimanskaya et al. | |
| 2011/0289105 | A1* | 11/2011 | Hershowitz | G06F 40/169 707/769 |
| 2012/0036423 | A1* | 2/2012 | Haynes, II | G06Q 30/0201 715/230 |
| 2012/0221954 | A1* | 8/2012 | Tanaka | H04L 41/22 715/736 |
| 2013/0060799 | A1* | 3/2013 | Massand | G06F 40/00 707/758 |
| 2013/0246901 | A1* | 9/2013 | Massand | G06F 40/197 715/229 |
| 2014/0028592 | A1* | 1/2014 | Wang | G06F 3/03545 345/173 |
| 2014/0032633 | A1* | 1/2014 | Kleppner | G06F 40/169 709/202 |
| 2014/0143661 | A1* | 5/2014 | Carreno-Fuentes | G06F 40/117 715/255 |
| 2014/0157163 | A1 | 6/2014 | Strutin-Belinoff et al. | |
| 2014/0215008 | A1* | 7/2014 | Wiles | G06F 16/972 709/217 |
| 2014/0281936 | A1* | 9/2014 | Wallis | G06F 3/0483 715/251 |

OTHER PUBLICATIONS

Microsoft Word (https://www.youtube.com/watch?v=zNXZD0cS0VM), Aug. 25, 2010,.*

Screen captures from YouTube video clip entitled "Widget Video Demonstration," 3 pages, uploaded on Aug. 25, 2010 by user "Sterling Miller". Retrieved from Internet: <http://www.youtube.com/widgetdemo>.

Microsoft Community, May 19, 2011, Microsoft forum, 1-5, http://answers.microsoft.com/enus/ office/forum/officeversion otherword/canisplitmyscreenandworkontwodocumentsat/996b8be52082e0119b4b68b599b31bf5?

* cited by examiner

The issue is, what is chicken? Plaintiff says "chicken" means a young chicken, suitable for broiling and frying. Defendant says "chicken" means any bird of that genus that meets contract specifications on weight and quality, including what it calls "stewing chicken" and ─302 plaintiff pejoratively terms "fowl". Dictionaries give both meanings, as well as some others not relevant here. To support its, plaintiff sends a number of volleys over the net; defendant essays to return them and adds a few serves of its own. Assuming that both parties were acting in good faith, the case nicely illustrates Holmes' remark  ing of a contract depends not on the agreement of two intention, but on the agreement of two sets of exte the parties' having meant the same thing but on the same thing." The Path of the Law, in Collected Leg have concluded that plaintiff has not sustained its persuasion that the contract used "chicken" in the narrower sense. ─304

The action is for breach of the warranty that goods sold shall correspond to the description, New York Personal Property Law, McKinney's Consol. Laws, c. 41, § 95. Two contracts are in suit. In the first, dated May 2, 1957, defendant, a New York sales corporation, confirmed the sale to plaintiff, a Swiss corporation, of

FIGURE 4 earned from other employment.• However, before projected earnings from other employment opportunities not sought or accepted by the discharged employee can be applied in mitigation, the employer must show that the other employment was comparable, or substantially similar, to that of which the employee has been deprived; the employee's rejection of or failure to seek other available employment of a different or inferior kind may not be resorted to in order to mitigate damages.••

In the present case defendant has raised no issue of reasonableness of efforts by plaintiffs to obtain other employment; the sole issue is whether plaintiff's refusal of defendant's substitute offer of "Big Country" may be used in mitigation. Nor, if the "Big Country" offer was of employment different or inferior when compared with the original "Bloomer Girl" employment, is there an issue as to whether or not plaintiff acted reasonably in refusing the substitute offer. Despite defendant's arguments to the contrary, no case cited or which our research has discovered holds or suggests that reasonableness is an element of a wrongfully discharged employee's option to reject, or fail to seek, different or inferior employment lest the possible earnings therefrom be charged against him in mitigation of damages.[5]

(6) Applying the foregoing rules to the record in the present case, with all intendments in favor of the party opposing the summary judgment motion - here, defendant - it is clear that the trial court correctly ruled that plaintiff's failure to accept defendant's tendered substitute employment could not be applied in mitigation of damages because the offer of the "Big Country" lead was of employment both different and inferior, and that no factual dispute was presented on that issue.

The mere circumstance that Bloomer Girl was to be a musical review calling upon plaintiff's talents as a dance as well as an actress and was to be produce in the City of Los Angeles, whereas Big Country was a straight dramatic role in a Western Type story taking place in an opal mine in Australia, demonstrates the difference in kind between the two employments; the female lead as a dramatic actress in a western style motion picture can by no stretch of imagination be considered the equivalent of or substantially similar to the lead in a song and dance production.

(7) Additionally the substitute Big Country offer proposed to eliminate or impair the director and screenplay approvals accorded to

Issues ⌐504

| Was new offer substantially similar to old contract? | ⌐506 |

"However, before projected earnings from other employment opportunities not sought or accepted by the discharged employee can be applied in mitigation, the employer must show that the other employment was comparable, or substantially similar, to that of which the employee has been deprived the employee's rejection of a failure to seek other available employment of a different or inferior kind may not be resorted to in order to mitigate damages."

"The sole issue is whether plaintiff's refusal of defendant's is substitute offer of "Big Country" may be used in mitigation."

⌐502

Procedure

⌐502

Reasoning
⌐506

"The mere circumstance that "Bloomer Girl" was to be a musical review calling upon plaintiff's talents as a dancer as well as an actress, and was to be produced in the City of Los Angeles whereas "Big Country" was a straight dramatic role in a "Western Type" story taking place in an opal mine in Australia, demonstrates the difference in kind between the two employments, the female lead as a dramatic actress in a western style motion picture can by no stretch of imagination be considered the equivalent of or substantially similar to the lead in a song-and-dance production"

"Additionally, the substitute "Big Country" offer proposed to eliminate or impair the director and screenplay approvals accorded to plaintiff's under the original "Blommer Girl" contract (see in 2 anle), and thus constituted an offer of inferior employment"

⌐502

Rule
⌐504

Reasonableness is not an element with respect to whether a wrongfully discharged employee needs to take substitute employment to mitigate dama "Despite defendant's arguments to the contrary, no case cited or which our research has discovered holds or suggests that reasonableness is an element of a wrongfully discharged employee's option to reject, or fail to seek, different or inferior employment test the possible earnings therefrom be charged against him in mitigation of damages.[5]"

⌐506

⌐502

Holding

METHOD AND SYSTEM FOR LABELING AND ORGANIZING DATA FOR SUMMARIZING AND REFERENCING CONTENT VIA A COMMUNICATION NETWORK

RELATED APPLICATIONS

This application is a continuation of U.S. patent application Ser. No. 14/215,843 filed on Mar. 17, 2014, currently pending, which claims priority to U.S. Provisional Application Ser. No. 61/793,717, filed on Mar. 15, 2013, the disclosure of which is hereby incorporated by reference in its entirety.

FIELD OF THE INVENTION

The present technology generally relates to computer-aided data summary systems and methods that assist users with analyzing data and, more particularly, to a method and system for obtaining, analyzing, labeling, organizing, combining, modifying, and/or summarizing data using single- and multi-action operations.

DESCRIPTION OF RELATED ART

Professionals and students often require the analysis and manipulation of data and information. Such individuals may practice or study in, without limitation, the fields of law, business, finance, medicine, legal education, business education, medical education, graduate education, undergraduate education, and K-12 education.

Existing technology generally requires users to: (i) either obtain pre-sorted data in excess of usability requirements or manually search for, gather, and organize multiple documents from various sources, (ii) obtain and utilize several tools to label and annotate such data, and/or (iii) manually organize, integrate, and summarize the original data with user-created data.

A need exists for a system and/or method that organizes information from multiple sources, allows users to easily and efficiently label such information, allows users to modify such information, allows users to combine and separate such information with other information, and displays all such information in a user-friendly format. Such a system, by automating and streamlining many labor-intensive steps involved in the above processes, would reduce the amount of work for and increase the efficiency of, users.

The systems and methods of the present technology can be used to automate and streamline many of these steps involved in these processes, through, but not limited to, single-action functionality.

SUMMARY OF THE INVENTION

Examples of the present technology can include components of a cloud-based (or other Internet-based) or device-based {such as a personal computer, tablet, smartphone, or other device) platform that provides a user with a streamlined interface/display with the functionality to display, label, organize, integrate, modify, and/or summarize information. Additional functionality includes, but is not limited to, simplified information selection, copying, cutting and pasting labeling/tagging, separation of annotations from information, integration of information, sorting through and displaying similar information or distinguishing dissimilar information, and other functions, either through single-action operation or otherwise, to provide an efficient user experience.

In one aspect, a data summary system is provided that includes a user device, a system server, and a communication link that operatively connects the user device and the system server. The user device can include a user device processor and a user device non-transitory computer readable medium. The system server can include a system processor and a system non-transitory computer readable medium. First program instructions can be stored on the user device non-transitory computer readable medium, which can be executed by the user device processor. When executed, the first program instructions can cause the user device to display a unique identifier selection box in response to selection of text of a source document by an input device of the user device. The unique identifier selection box can include a plurality of unique identifiers. When executed, the first program instructions can also cause the user device to, in response to selection of a unique identifier of the plurality of unique identifiers from the unique identifier selection box by the input device, send a dataset to the system server. The dataset can include the text selected by the input device, the selected unique identifier, and a user identifier. Second program instructions can be stored on the system non-transitory computer readable medium, which can be executed by the at least one system processor. When executed, the second program instructions can cause the system server to receive the dataset from the user device, store the dataset in the system non-transitory computer readable medium, and automatically generate a summary including the text and a listing of each of the plurality of unique identifiers. The text may be listed under the selected unique identifier in the summary.

Additionally, or alternatively, the step of storing the dataset in the system non-transitory computer readable medium includes storing the text of and the selected unique identifier in a user profile based on the user identifier. The step of automatically generating the summary may include linking the text to the source document. The second program instructions may, when executed, further cause the data summary system to generate a split screen that includes the source document and the summary, provide the split screen to be displayed at the user device, generate a notes area configured to receive additional information input by the user, provide the notes area to be displayed at the user device alongside the split screen, receive custom information from the user device, and storing the custom information in the user profile. The custom information may be input under the selected unique identifier. The summary may include the custom information listed under the unique identifier. The step of generating the summary may include prioritizing the custom information relative to the text. The first program instructions, when executed, may cause the data summary system to display the summary, display an information type selection box, and display a unique identifier activation box. User interaction with the information type selection box may determine whether the custom information of the summary is displayed and whether the text of the summary selected from the source document is displayed. The text of the summary selected from the source document and corresponding to the selected unique identifier may be displayed only if a selection box of the unique identifier activation box corresponding to the selected unique identifier is selected.

In another aspect, a method is provided that can be implemented by a data summary system that includes a user device, a system server, and a communication link that operatively connects the at least one user device and the at least one system server. The method can include steps of: determining, by the user device, that first user-identified information has been selected from a first source document, displaying, by the user device, a unique identifier selection box comprising a plurality of unique identifiers in response to the selection of the first user-identified information, determining, by the user device, that a first unique identifier of the plurality of unique identifiers has been selected from the unique identifier selection box, determining, by the user device, that second user-identified information has been selected from a second source document, displaying, by the user device, the unique identifier selection box in response to the selection of the second user-identified information, determining, by the user device, that a second unique identifier of the plurality of unique identifiers has been selected from the unique identifier selection box; sending, by the user device, a first dataset to the system server, the first dataset including the first user-identified information and the first unique identifier, sending, by the user device, a second dataset to the system server, the second dataset including the second user-identified information and the second unique identifier, and generating, by the system server in response to a user command, a summary including the first user-identified information, the second user-identified information, and a listing of each of the plurality of unique identifiers. The first user-identified information may be grouped with the first unique identifier in the summary, and the second user-identified information may be grouped with the second unique identifier in the summary.

Additionally or alternatively, the method may further include receiving, by the system server from the user device, first custom information input under the first unique identifier, and receiving, by the system server from the user device, second custom information listed under the first unique identifier, and the second custom information listed under the second unique identifier. Generating the summary may include prioritizing, by the system server, the first custom information relative to the first user-identified information, and prioritizing, by the system server, the second custom information relative to the second user-identified information. The method may further include displaying, by the user device, the summary generated by the system server, and displaying an information type selection box. User interaction with the information type selection box may determine which of the first and second custom information and/or the first and second user-identified information is displayed. The method may further include displaying, by the user device, a unique identifier activation box. The first user-identified information of the summary may be displayed only if a first selection box of the unique identifier activation box corresponding to the first unique identifier is selected, wherein the second user-identified information of the summary may be displayed only if a second selection box of the unique identifier activation box corresponding to the second unique identifier is selected. The method may further include linking the first user-identified information to the first source document and linking the second user-identified information to the second source document.

In another aspect, a method is provided that can be implemented by a data summary system that includes a user device, a system server, and a communication link that operatively connects the at least one user device and the at least one system server. The method may include receiving and storing, by the system server, a plurality of datasets including user-identified information and a plurality of unique identifiers associated with portions of the user-identified information, generating, by the server system, a summary including the user identified information and a listing of the plurality of unique identifiers by reformatting the user-identified information such that a first portion of the user-identified information associated with a given unique identifier of the plurality of unique identifiers is listed in the summary under the given unique identifier, displaying, by the user device, a unique identifier activation box that includes selection boxes for each of the unique identifiers, and displaying, by the user device, only portions of the summary corresponding to a subset of the unique identifiers that have been selected via the selection boxes of the unique identifier activation box.

Additionally or alternatively, the plurality of datasets may include custom information associated with the plurality of unique identifiers. A first portion of the custom information may be associated with the given unique identifier. Generating the summary may include prioritizing, by the system server for the given unique identifier, the first portion of the custom information relative to the first portion of the user-identified information. The method may further include displaying, by the user device, an information type selection box. User interaction with the information type selection box may determine whether the user-identified information and/or the custom information of the summary is displayed by the user device. The user-identified information may include text selected from a source document. The method may further include linking, by the system server, the text of the user-identified information to the source document. The method may further include generating, by the system server, a split screen view that includes the source document and the summary, providing, by the system server to the user device, the split screen view generated by the system server, and displaying, by the user device, the split screen view.

BRIEF DESCRIPTION OF THE DRAWINGS

Specific examples have been chosen for purposes of illustration and description, and are shown in the accompanying drawings, forming a part of the specification.

FIG. 6 illustrates one example of a summary created by single-action operation.

DETAILED DESCRIPTION

Figure 1:
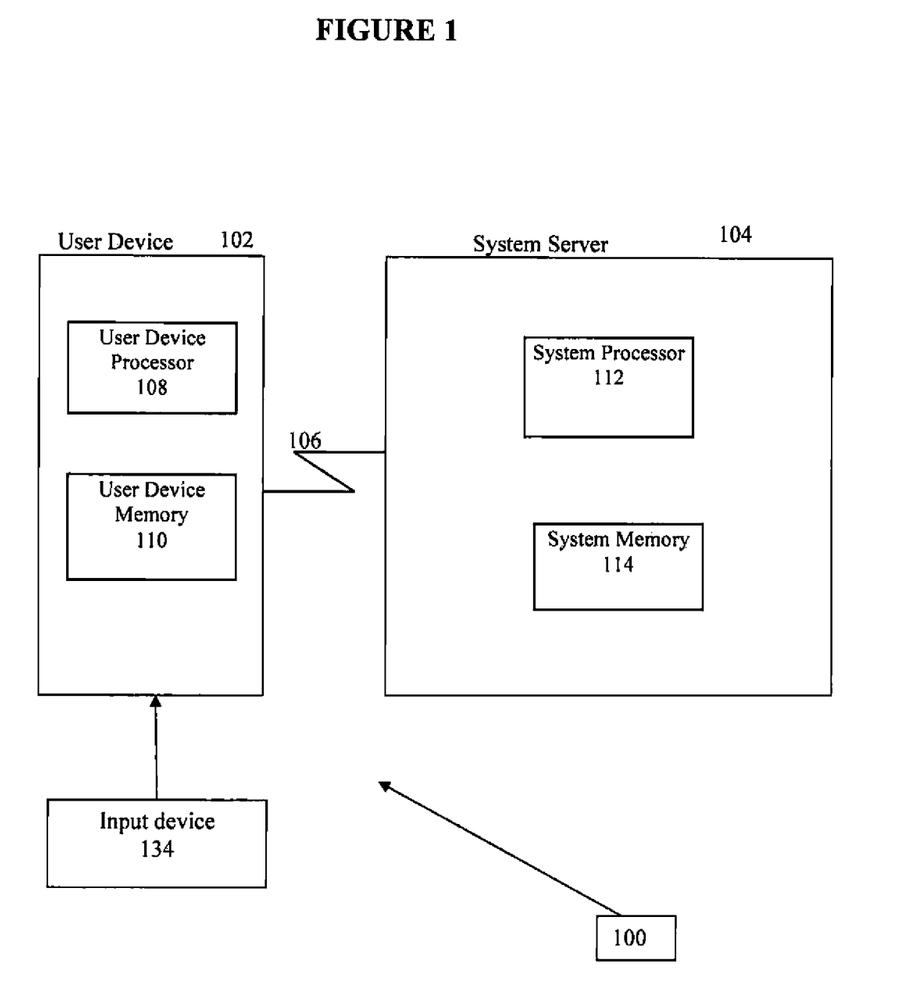
FIG. 1 illustrates a diagram of hardware system components for one example of a data summary system of the present technology.
Figure 2:
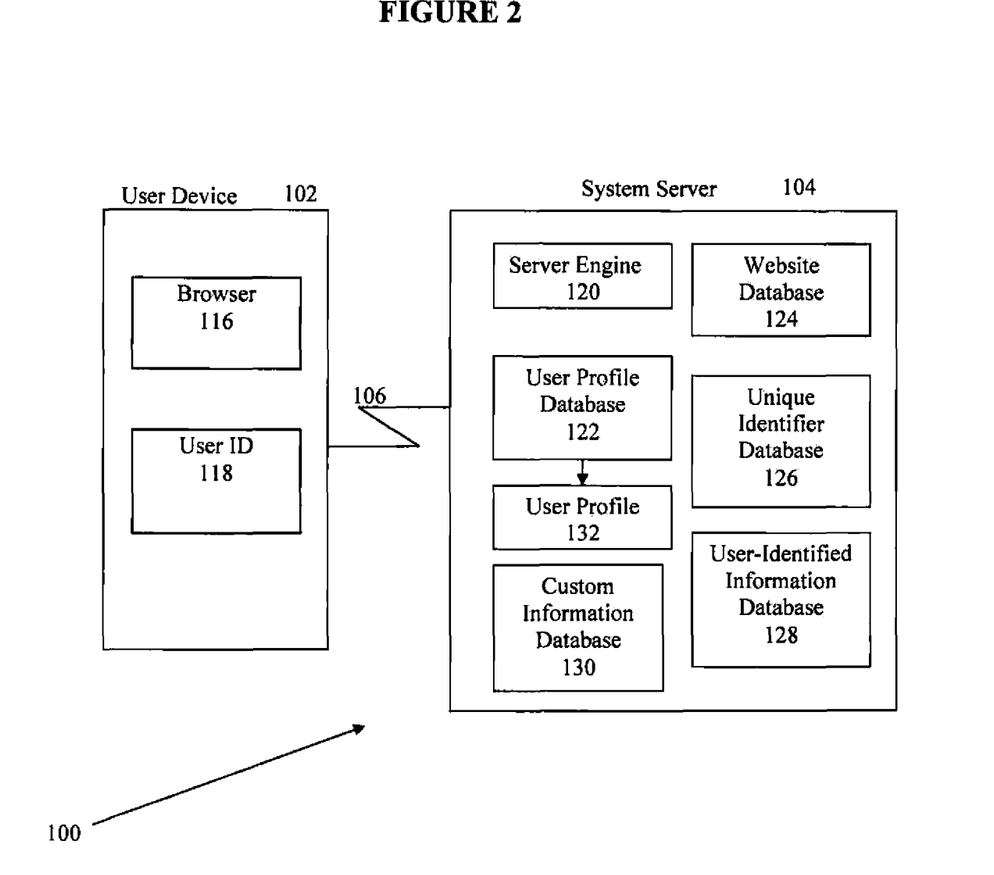
FIG. 2 illustrates a diagram of one example of software system components that can be used in the system of FIG. 1.

FIGS. 1 and 2 illustrates an embodiment of the system architecture of one example of a data summary system 100 of the present technology. As shown in FIGS. 1 and 2, the data organizing system includes at least one user device 102 and at least one system server 104, and a communication link 106, through which the user device 102 and system server 104 are operatively connected. The term "operatively connected" as used herein means that the at least one user device 102 and the at least one system server 104 can send and receive data to one another through the communication link 106. The communication link 106 can include a wired connection or a wireless connection, and can be via a local area network (LAN) connection, or via a wide area network (WAN) connection, such as the Internet.

The hardware components of each of the user device 102 and the system server 104 include at least one processor, and at least one non-transient computer readable storage medium, such as a memory. As shown in FIG. 1, the user device 102 includes at least one user device processor 108 and at least one user device memory 110, and the system server includes at least one system processor 112 and at least one system memory 114. The user device 102 can also include an input device 134, that the user can use to input commands to the user device 102, such as selection of user identified information. The input device 134 can include one or more of a keyboard, a mouse, an electronic pointing device, a touch screen, or any other suitable device.

Examples of system architecture components of each of the user device 102 and the system server 104 are illustrated in FIG. 2.

As shown, the user device 102 includes a browser 116, which is assigned a unique user identifier 118. The user identifier 118 is an identifier that identifies the user device 102 to the server system 104. The user identifier may be stored in a file referred to as a "cookie." In one example, the server system 104 can assign and send the user identifier 118 to the user device 1 02 once, when the user device 102 first interacts with the server system 104. Once the user device 102 receives the user identifier 118, the user device stores the user identifier 118, such as in the user device memory 110, and provides it with every message sent to the server system 104. The server system 104, which can have communication links with any number of user devices, can thus identify the user device 102 as being the source of the message.

As also shown in FIG. 2, the server system 104 can include a server engine 120, user profile database 122 including a stored user profile 132 associated with each user identifier, a website database 124 including web pages, a unique identifier database 126, a user-identified information database 128, and a custom information database 130. Each database of the server system 104 can be stored in the system memory 114. The server engine 120 can include at least the system processor 112.

In the illustrated example, the server system 104 associates, and operatively links, each user identifier 118 with a user profile 132 stored in the user profile database 122, unique identifiers, user-identified information identified by the user device 102, and custom information received from the user device 102.

In some examples, the server engine 120 receives HTTP requests from a user device 102 to access web pages identified by URLs, and provides the requested web pages from the website database 124 to the user device 102. However, one of ordinary skill in the art would appreciate that the summary techniques described herein could be used in various environments other than the Internet. For example, the summaries could also be in an electronic mail environment. Also, a server system 104 or user device 102 may include any combination of hardware or software suitable for performing the methods described herein. For example, a user device 102 may comprise any combination of hardware or software that can interact with the server system 104. Either the user device 102 or the server system 104 can include one or more handheld devices, personal computers or television- or tablet-based systems, or various consumer computer products through which information may be generated.

Figure 3:
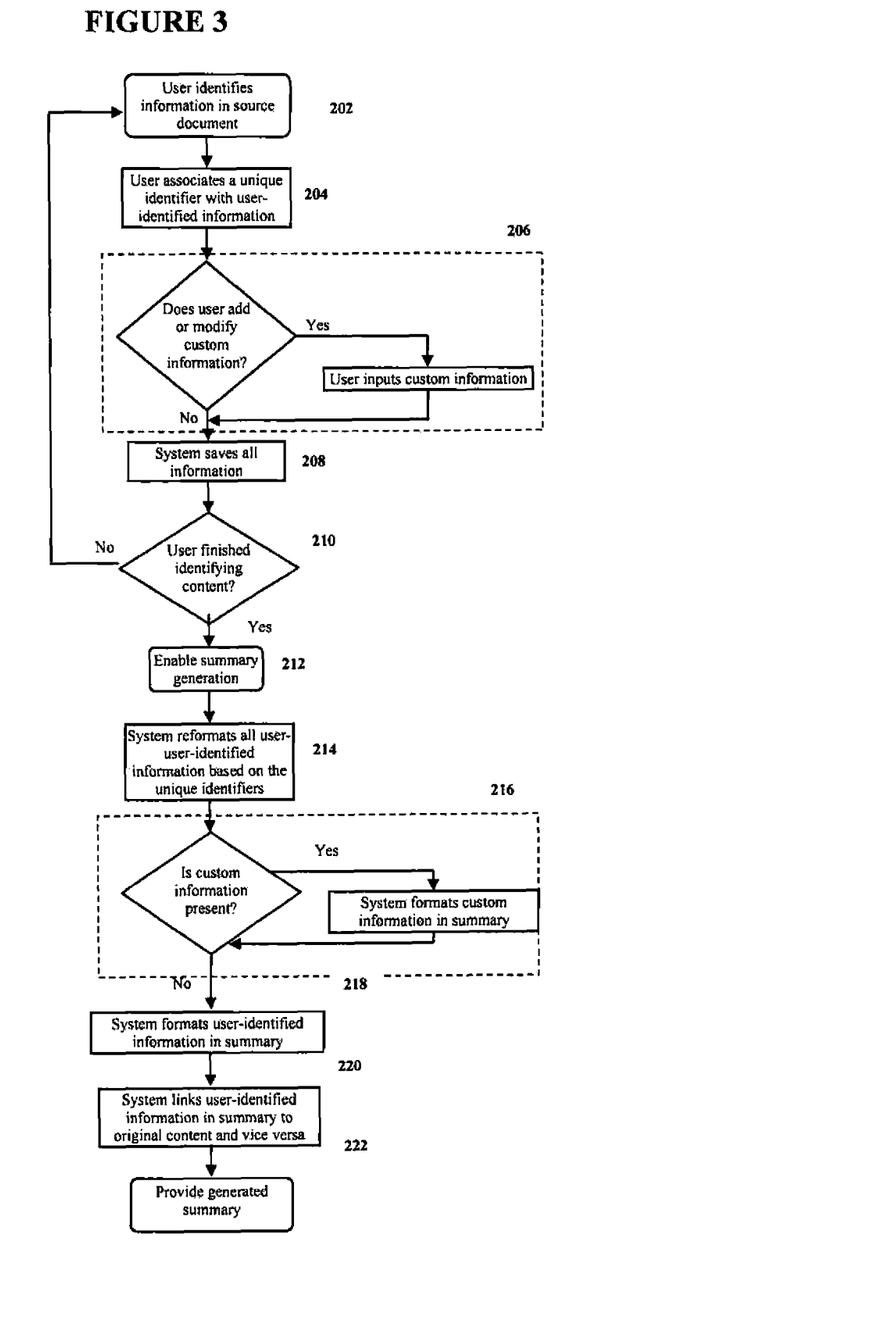
FIG. 3 illustrates a flow chart of one embodiment of a data summary method of the present technology.

FIG. 3 illustrates one example of a data summary method of the present technology. At step 202, a user uses the user device 102 to identify user-identified information in a source document. The source document can be any electronic document, such as digital text, media, web pages, or other content to be included in the summary. The user can identify the user-identified information by selecting a subset of text in a source document, such as by highlighting the text and clicking a mouse to select the text. Once the user has selected the user-identified information, the user may be prompted to associate such user-identified information with a unique identifier. At step 204, the user associates a unique identifier with the user-identified information. The user can select the unique identifier associated with the user-identified information from a plurality of predefined unique identifiers, such as a listing of unique identifiers presented in a drop-down menu. Alternatively, the unique identifiers can be customized by the user. At step 206, the summary system allows the user to input or modify additional custom information under the unique identifier. The user device 102 then sends a first data set to the server system 104 via the communication link 106. The first data set includes the user identifier 118, the user-identified information, and the unique identifier associated with the user-identified information. The server system 104 receives the first dataset, recognizes the user identifier, and stores the user-identified information in the user's profile. If the user did not input or modify additional custom information, the server system 104 saves the user-identified information under the unique identifier chosen by the user. However, if the user did modify or input custom information, the server system 104 saves the new or modified custom information, along with the user-identified information.

At step 210, the summary system determines whether the user is done creating user-identified information. If the user is not done, the method repeats steps 202 through 208, with the user selecting user-identified information from any one or more source documents, which can be the same or different from the original source document and each other. If the user has completed identifying user-identified information, the method progresses to step 212.

At step 212, the server system enables the generation of a data summary. In some examples, the user can cause the server system 104, or the user device 102, to generate the summary with a single action. For example, the user can enter a single command, such as a mouse click on a button in a selection box displayed by the user device 102, which the user device 102 sends to the system server 104, in order to cause the server system 104 to create a summary of the user-identified information and any custom information. In an example where the user device is being used offline, the user can enter the single command in order to cause the user device 102 to create a summary of the user-identified information and any custom information. If the user enters the command, summary system 100 proceeds to step 214, where the summary system 100, either through the server system 104 or the user device 102, reformats the user-identified information and the associated unique identifier, and reformats the information in order to generate a summary. Generating a summary includes prioritizing and formatting the information received from the user. For example, if custom information is present under a unique identifier, the summary system 100 can format the custom information in the summary, including prioritizing the custom information relative to, such as above or below, the user-identified information for any given unique identifier at step 216. Additionally, at step 218, the system formats the user-identified information into the summary. In generating the summary, the summary system 100 can link the summarized information to the original information and vice versa at step 220. Finally, at step 222, the summary system 100 can provide the generated summary to the user. If the server system 104 generated the summary, the summary can be provided to the user by sending the generated summary to the user device 102 via the communication link 106.

In examples where the user can cause the summary to be generated with a single action, once the user initiates the single-action (via a mouse click, keystroke, or otherwise), the system generates a formatted summary. The summary system 100 can also allow the user to modify the generated summary. In general, the user need only enter the user-identified information, and any custom information, under each unique identifier, and then execute the single action in order to generate a summary. Such systems can allow the user to efficiently and reliably generate a summary of digital text, media, web pages, or other content.

In alternative examples, a multi-action operation can be used, which can include defining a custom summary format through multiple mouse clicks and/or keystrokes prior to generating the summary.

Figure 4:
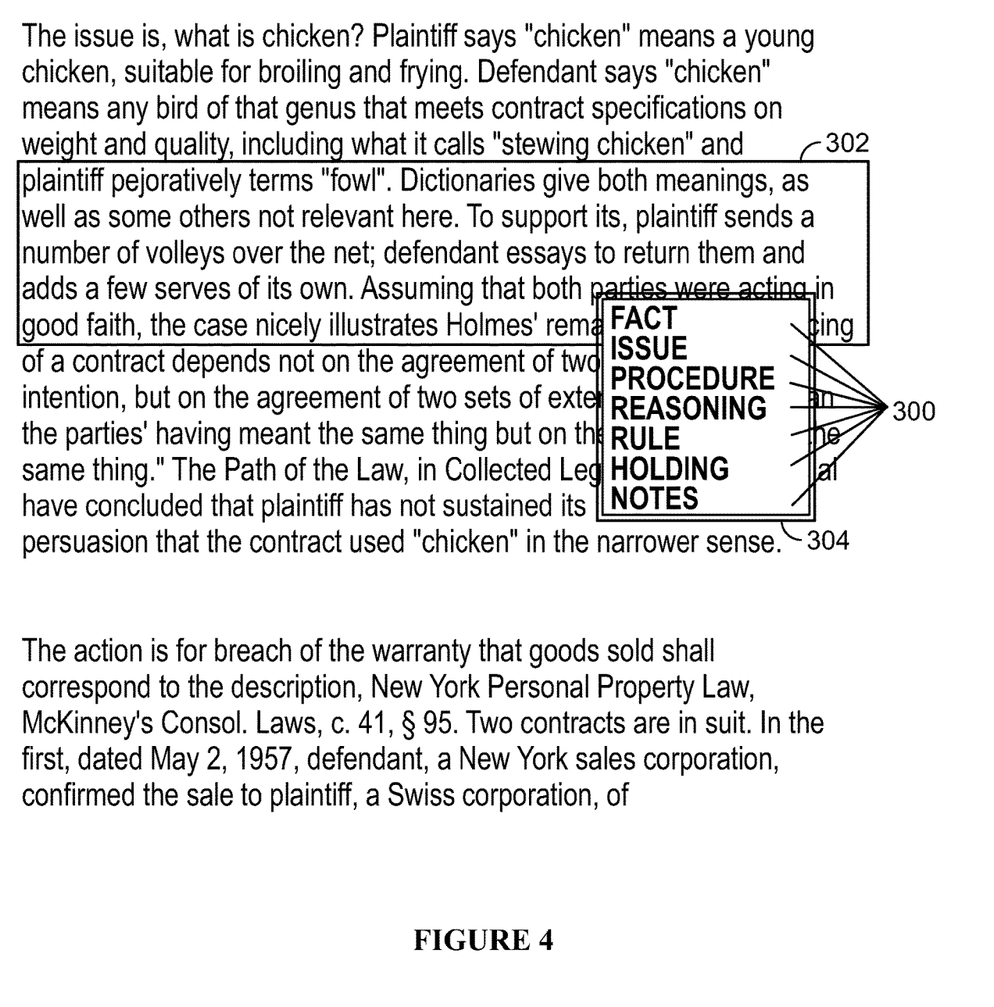
FIG. 4 illustrates one embodiment of how a user could associate user-identified information with a unique identifier.

FIG. 4 illustrates one embodiment of how the user can assign a unique identifier 300 to a selection of user-identified information 302. In this example, once the user-identified information 302 is selected by the user, a unique identifier selection box 304 is displayed by the user device 102, providing the user with various predefined or common unique identifiers 300. These may include, as examples only, Fact, Issue, Procedure, Reasoning, Rule, Holding, Notes. The user can then select the unique identifier 300 to be associated with the user-identified information 302 through a single action (via a mouse click or otherwise) or multiple actions. Once a particular unique identifier 300 is selected by the user (via a mouse click or otherwise), the summary system 100 associates that unique identifier 300 with the particular selection of user-identified information 302, and saves such association for possible further processing. The summary system 100 can allow the user to modify and customize the unique identifiers 300 and the unique identifier selection box 304.

Figure 5:
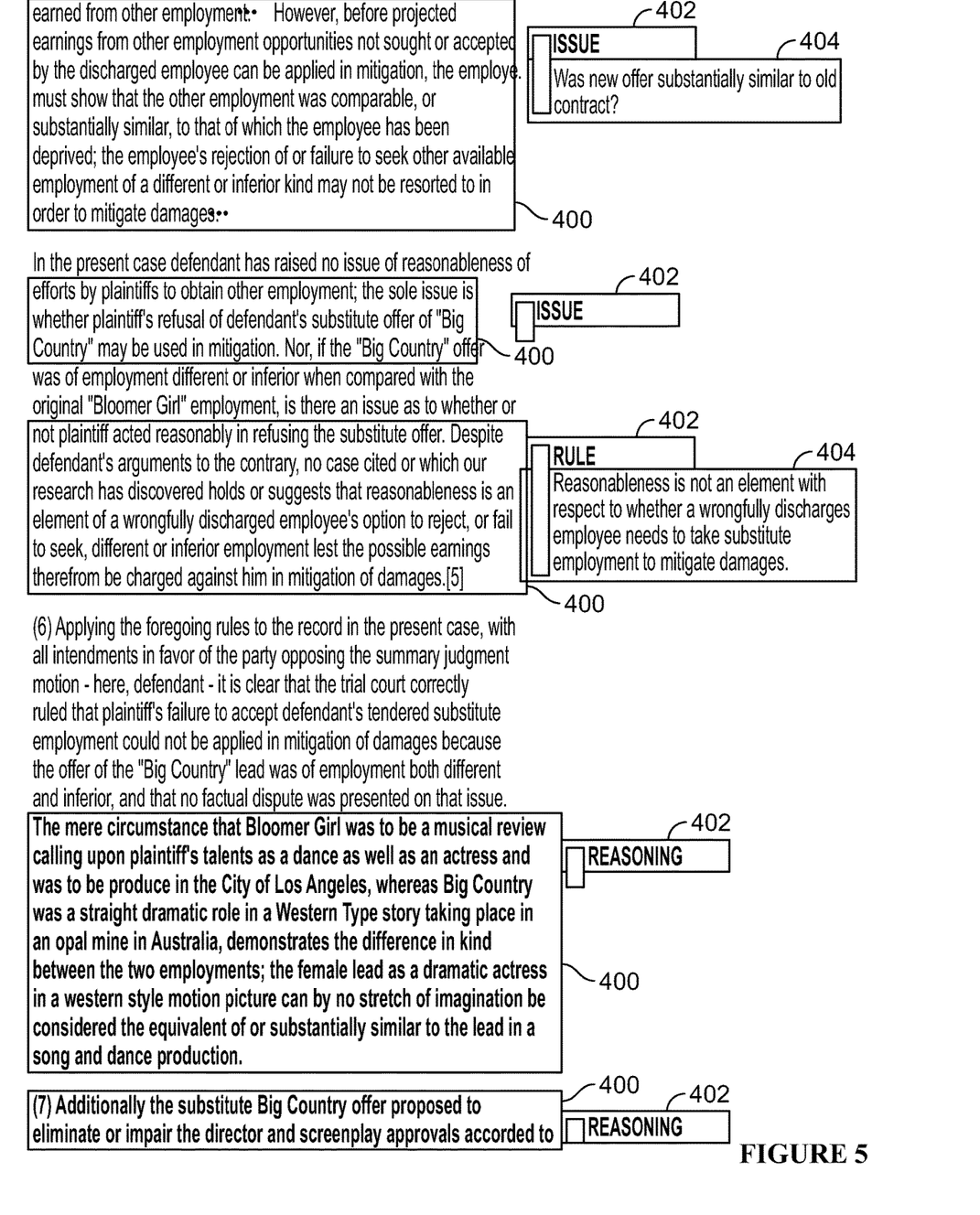
FIG. 5 illustrates one example of user-identified information before single-action operation.

FIG. 5 illustrates one example of content where the user has identified user-identified information 400, and associated the user-identified information 400 with unique identifiers 402 and the system has saved such information under the user's profile. In some instances, the user has input custom information 404 under the unique identifiers. The summary system 100 stores the user-identified information 400, the unique identifiers 402, and the custom information 404 in the system server 104 in association with the user identifier 118.

FIG. 6 illustrates one example of a summary 500 generated by the system server 104 of the summary system 100. The summary 500 includes a listing of each unique identifier 502. Under each unique identifier 502, any custom information 504 and user-identified information 506 associated with the unique identifier 502 are listed. The custom information 504 is illustrated as being prioritized over the user-identified information 506 for each unique identifier 502. The system can, however, be customized to prioritize custom and user-identified information in any order.

Figure 7:
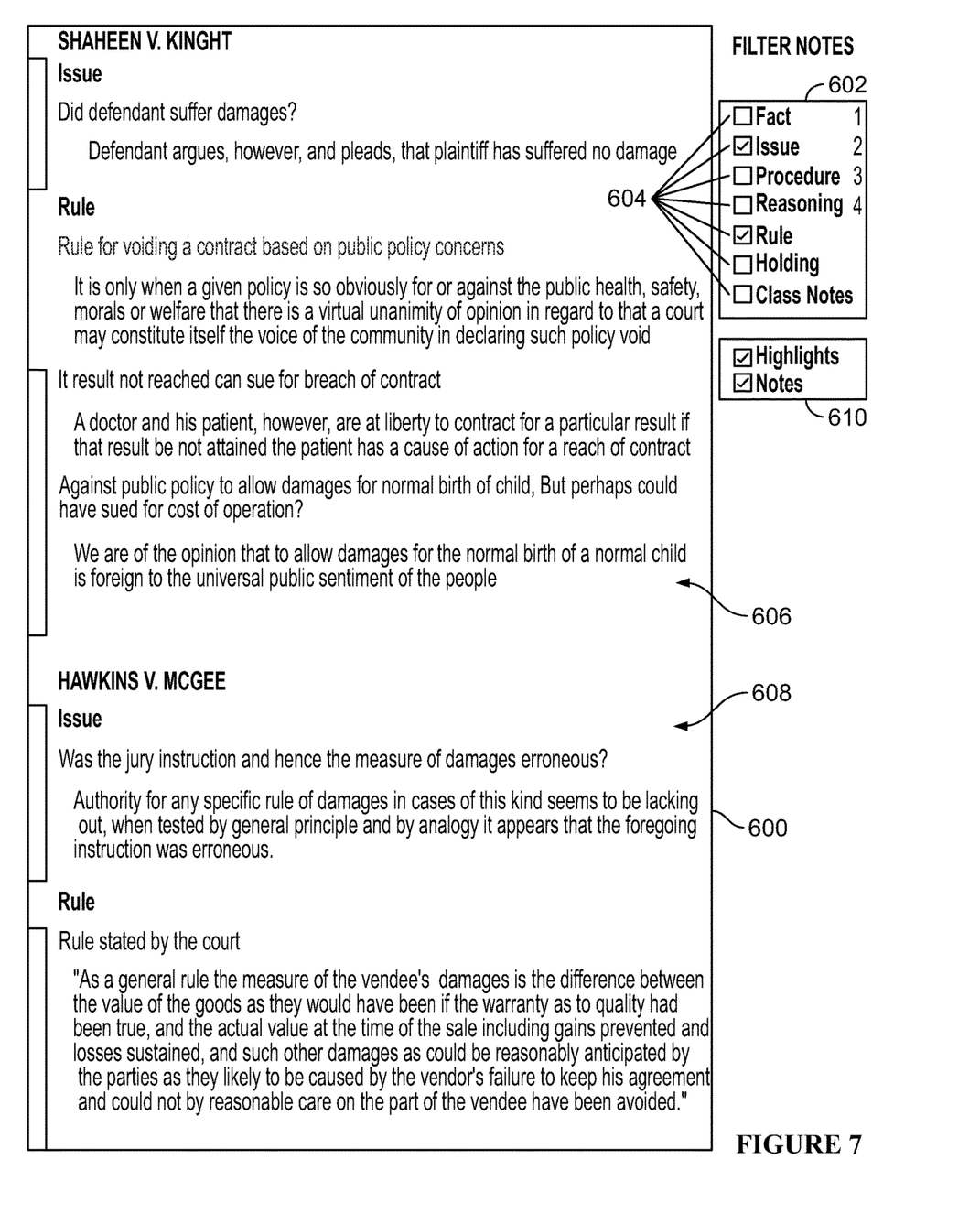
FIG. 7 illustrates one embodiment of how a user can aggregate, manipulate, and distinguish information from multiple summaries.

The summary system 100 can also aggregate multiple summaries, and allow the user to view user-identified information and/or custom information by unique identifier across multiple summaries. FIG. 7 illustrates one example of how multiple summaries 600 can be aggregated and how unique identifiers can be used to filter and/or distinguish information from multiple summaries. In this example, a unique identifier activation box 602 is used to allow the user to select desired unique identifiers 604, by checking the indicated selection box(es). The summary system 100 generates a display of all of the user-identified information 606 and custom information 608 associated with the selected unique identifiers 602. An information type selection box 610 can be used to display user-identified information 606, custom information 608, or both. In this example, the information type selection box 610 differs from the unique identifier activation box 602 in that the information type selection box 610 allows the user to choose to display either user-identified information 606 or custom information 608, or both, across multiple summaries, while the unique identifier activation box 602 allows the user to choose to display information (either user-identified information 606 or custom information 608, or both) associated with certain unique identifiers (and exclude others) across multiple summaries 600. Thus, a compilation of summaries can be created by the summary system 100.

Figure 8:
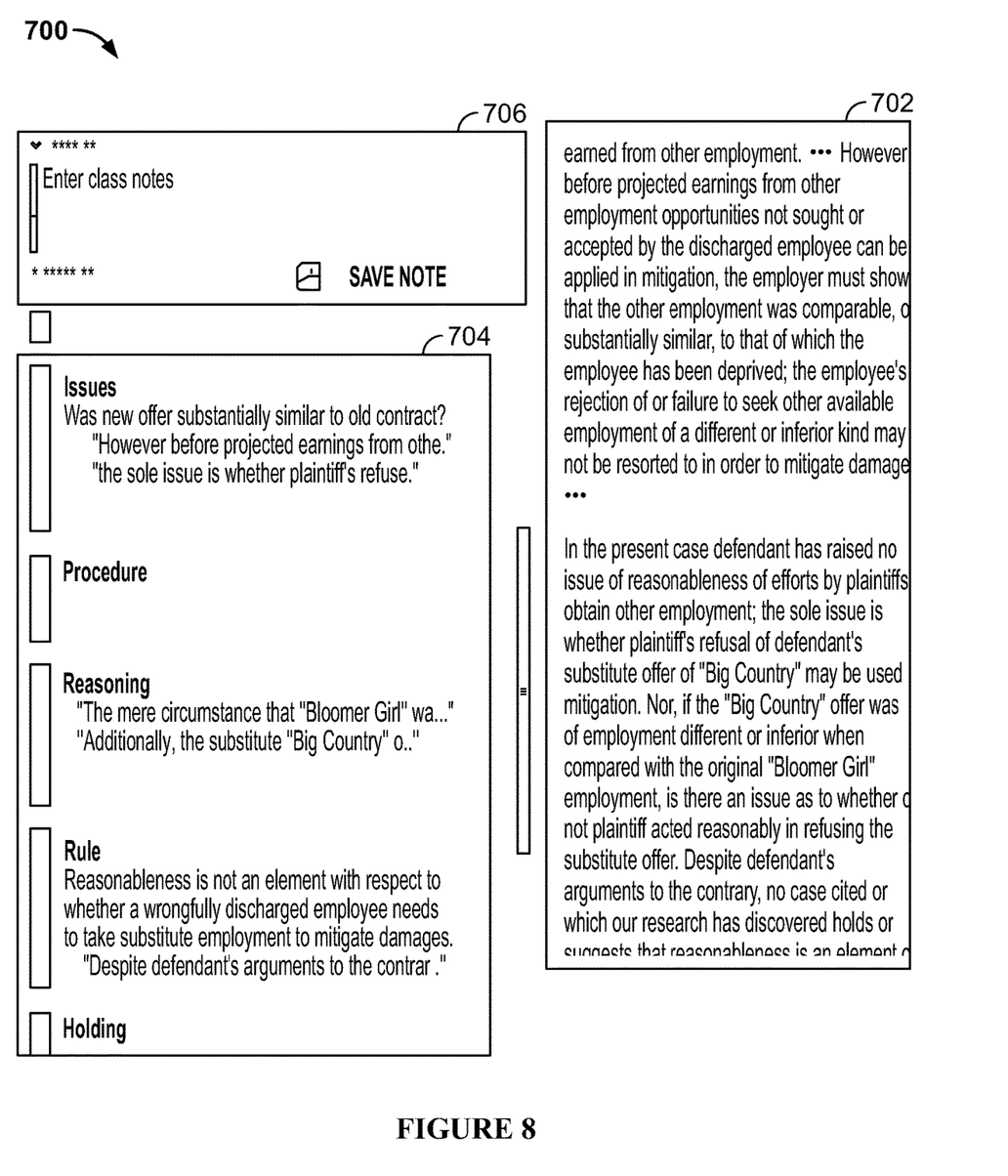
FIG. 8 illustrates a merged view showing one embodiment of the linking between FIGS. 1 & 2.

FIG. 8 illustrates an integrated view of source document 702 and a summary 704 in a split-screen display 700. The source document 702 includes the original digital text, media, web pages, or other content. As shown, the summary system can link the summarized information to the original information in the source document, and vice versa. This example also includes a notes area 706, for the user to input additional information.

Figure 9:
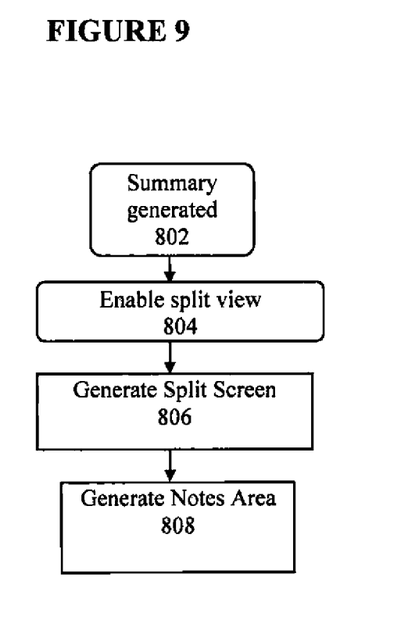
FIG. 9 illustrates a flow chart of one embodiment of the merging summary data with original content.

FIG. 9 is a flow diagram of a process for generating the split screen view of FIG. 8. At step 802, the server system 104 generates the summary, which can be in accordance with the process illustrated in FIG. 3. At step 804, the summary system enables the user to select a split view, such as by displaying a selection box to the user via the user device and sending a user selection to the system server 104. At step 806, the split screen is generated by the server system 104, and sent to the user device 102 to be displayed to the user. In generating the split screen, the summary system 100 can maintain the links between the source document and the user-identified information. Additionally, at step 808, the summary system can also generate the notes area 706, which can be sent to the user device 102 to be displayed to the user, where the user can input additional information.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A method implemented by a data summary system comprising a user device, a system server, and a communication link that operatively connects the user device and the system server, the method comprising steps of:
- determining, by the user device, that first user-identified information has been selected from a first source document;
- retrieving a preconfigured grouping of a plurality of unique identifiers;
- displaying, by the user device, a unique identifier selection box comprising the plurality of unique identifiers in response to the selection of the first user-identified information;
- determining, by the user device, that a first unique identifier of the plurality of unique identifiers has been selected from the unique identifier selection box;
- determining, by the user device, that second user-identified information has been selected from the first source document;
- displaying, by the user device, the unique identifier selection box in response to the selection of the second user-identified information;
- determining, by the user device, that a second unique identifier of the plurality of unique identifiers has been selected from the unique identifier selection box;
- determining, by the user device, that third user-identified information has been selected from a second source document;
- displaying, by the user device, the unique identifier selection box in response to the selection of the third user-identified information;
- determining, by the user device, that the first unique identifier of the plurality of unique identifiers has been selected from the unique identifier selection box;
- determining, by the user device, that fourth user-identified information has been selected from the second source document;
- displaying, by the user device, the unique identifier selection box in response to the selection of the fourth user-identified information;
- determining, by the user device, that the second unique identifier of the plurality of unique identifiers has been selected from the unique identifier selection box;
- sending, by the user device, a first dataset to the system server, the first dataset including the first user-identified information, the second user-identified information, the first unique identifier, and the second unique identifier;
- sending, by the user device, a second dataset to the system server, the second dataset including the third user-identified information, the fourth user-identified information, the first unique identifier, and the second unique identifier;
- storing the first dataset and the second dataset in a memory of the system server; and
- generating, by the system server in response to a user command, a summary of the first source document and the second source document from the first dataset and the second dataset stored in the memory by formatting the first user-identified information and the third user-identified information based on the first unique identifier and the second user-identified information and the fourth user-identified information based on the second unique identifier, wherein the summary includes a first section corresponding to the first source document and a second section corresponding to the second source document,
- wherein the first section includes a first title of the first source document under which is included a first contiguous listing of (1) first text headings corresponding to each of the plurality of unique identifiers, (2) the first user identified information, and (3) the second user identified information,
- wherein the second section includes a second title of the second source document under which is included a second contiguous listing of (1) second text headings corresponding to each of the plurality of unique identifiers, (2) the third user identified information, and (3) the fourth user identified information under a second title of the second source document,
- wherein the first user-identified information is grouped with the first unique identifier in the first section of the summary,
- wherein the second user-identified information is grouped with the second unique identifier in the first section of the summary,
- wherein the third user-identified information is grouped with the first unique identifier in the second section of the summary, and
- wherein the fourth user-identified information is grouped with the second unique identifier in the second section of the summary.

2. The method of claim 1, further comprising:
- receiving, by the system server from the user device, first custom information relating to the first source document and input under the first unique identifier; and
- receiving, by the system server from the user device, second custom information relating to the second source document and input under the second unique identifier, wherein the summary includes the first custom information listed under the first unique identifier in the first section, and the second custom information listed under the second unique identifier in the second section.

3. The method of claim 2, wherein generating the summary comprises:
- retrieving the first custom information from the first data set and the second custom information form the second data set;
- positioning, by the system server, the first custom information above or below the first user-identified information; and
- positioning, by the system server, the second custom information above or below the second user-identified information.

4. The method of claim 2, further comprising:
- displaying, by the user device, the summary generated by the system server; and
- displaying an information type selection box, wherein user interaction with the information type selection box determines which of the first and second custom information and/or the first and second user-identified information is displayed.

5. The method of claim 4, further comprising:
- displaying, by the user device, a unique identifier activation box, wherein the first user-identified information and the third user-identified information is displayed only if a first selection box of the unique identifier activation box corresponding to the first unique identifier is selected, and wherein the second user-identified information and the fourth user identified information is displayed only if a second selection box of the unique identifier activation box corresponding to the second unique identifier is selected.

6. The method of claim 1, further comprising:
linking the first user-identified information and the second user-identified information to the first source document; and
linking the third user-identified information and the fourth user-identified information to the second source document.

* * * * *